United States Patent Office 2,695,910
Patented Nov. 30, 1954

2,695,910

METHODS OF PREPARATION OF SUPERBASED SALTS

Peter A. Asseff, Thomas W. Mastin, and Alan Rhodes, Cleveland, Ohio, assignors to The Lubrizol Corporation, Wickliffe, Ohio, a corporation of Ohio No Drawing. Application May 3, 1951, Serial No. 224,458

11 Claims. (Cl. 260—413)

This invention relates to new compositions of matter and more particularly pertains to novel organic metal complexes and novel methods of producing same.

It is known in the art as exemplified by Griesinger, Patent No. 2,402,325, Campbell et al., Patent No. 2,485,-861, and Mertes, Patent No. 2,501,731, that a normal sulphonate or a sulphonic acid, particularly those derived from petroleum oils can be combined with substantially more salt forming reagent or inorganic metal compound than is theoretically required to replace the acidic hydrogens of the acid compound. Essentially the technique for obtaining such materials involves the use of a large excess of neutralizing agent or inorganic metal compound with either the normal sulphonate or the sulphonic acid and water, and then dehydrating the process mass at elevated temperatures. While the exact constitution of the product is not known some prior art workers believe on the basis of the Tyndall effect, that the excess basicity is attributed to a dispersion or colloidal suspension of the inorganic metal compound or neutralizing agent by means of the normal sulphonate acting as a dispersing agent. In any event, such compositions are known to possess an unusually high degree of basicity which cannot be accounted for by the theory advanced by other prior art workers that excess basicity is due to the mere replacement in part of some of the hydroxyl groups or other substituents on the inorganic metal compound. These products are known today as basic salts or soaps.

A more recent advance in the production of high metal content complexes is shown in our copending application, Serial No. 216,101; filed on March 16, 1951, and Patents Nos. 2,617,049; 2,616,924; 2,616,925; 2,616,911; 2,616,904; 2,616,905; and 2,616,906. In these copending applications, there is described a process of preparing complexes by combining an acidic organic compound and/or the salt thereof, a compound known as the promoter, an inorganic metal compound, and water and then removing substantially all of the water at preferably elevated temperatures. The complexes obtained by the just described method contain substantially more metal in combination than is possible by the techniques disclosed and claimed in the aforementioned patents to Mertes, Campbell et al. and Griesinger.

Now, however, in accordance with the present invention a still greater advance is made by the preparation of complexes having metal contents which are substantially greater than any of the complexes obtainable by the prior art methods or the methods taught in our copending applications referred to above. The significant feature of the present invention resides in the discovery that any of the complexes produced in accordance with methods described above can be employed as starting materials in the production of the products of the present invention.

Therefore, it is an object of this invention to provide novel organic metal complexes which contain substantially more metal in combination than is found in complexes prepared by the prior art. Another object is to provide novel methods of producing organic metal complexes which contain substantially more metal in combination than is found in complexes prepared in accordance with the methods known in the prior art and others as described hereinabove.

Other advantages of this invention will be apparent from the following description and explanation thereof.

For convenience hereinafter, the organic metal complexes prepared in accordance with the present invention will be referred to as the "super based salts." Further, complexes produced in accordance with the method taught by Mertes, Griesinger, and Campbell et al. will be hereinafter referred to as the "basic salts." On the other hand, those complexes which are derived by the methods described in the above-referred-to copending applications will be hereinafter referred to as the "metal complexes." Furthermore, those materials containing more metal in combination than is required to form the neutral or normal salt and which are employed as starting materials in the present invention, will be referred to hereinafter in a generic sense as the "organic salt complexes."

Essentially, this invention is concerned with super-based salts prepared by the method comprising the treatment of an organic salt complex with a material which possesses acid characteristics under process conditions (which material will be hereinafter referred to as the acidic material), and then combining said treated organic salt complex with an inorganic metal compound, with or without water, and with or without a material hereinafter referred to as a "promoter," and then removing substantially all of the water which may be present.

As indicated hereinabove the super-based salts are prepared from starting materials which in every instance contain substantially more metal than is equivalent to the anionic radicles of the normally oil-soluble salt. For example, these starting materials include the basic salts and metal complexes which are prepared in accordance with the methods described hereinabove. However, it should be understood that the present invention is applicable when employing any organic salt complex as a starting material or in effect any material which contains metal in excess of what is required for the formation of the normal or neutral salt.

The metal complex

The metal complexes which may be employed as starting materials are prepared in accordance with the methods described in our aforesaid copending applications. Essentially, an acidic organic compound and/or the metal salt thereof, a promoter material, an inorganic metal compound and water are combined and mixed thoroughly, and then substantially all of the water is removed at preferably elevated temperatures. The acidic organic compounds and the salts thereof, more particularly the organic acids which form oil-soluble metal salts and the oil-soluble metal salts thereof include a variey of classes of compounds, such as for example, the carboxylic acids, the oil-soluble metal salts of carboxylic acids, the sulfur acids, the oil-soluble metal salts of sulfur acids, acids of phosphorus, the oil-soluble metal salts of acids of phosphorus, etc.; and the thio-analogues of the foregoing compounds. The starting material can be (1) a single acidic organic compound or mixtures of same, (2) a single salt of an acidic organic compound or mixtures of same and (3) a mixture of an acidic organic compound and the corresponding salt or salts.

The oil-soluble carboxylic acids include for example, fatty acids, carbamic acids, alkylated aromatic carboxylic acids, etc. The oil-soluble carboxylic acids can be the aliphatic, cycloaliphatic, or the aliphatic substituted aromatic type. The aliphatic carboxylic acids should contain a total of at least about 15–18 carbon atoms; the cycloaliphatic carboxylic acids should contain a total of at least about 12–15 carbon atoms, and the aliphatic substituted aromatic carboxylic acids should contain a total of at least about 12 carbon atoms in the aliphatic substituent or substituents.

The oil-soluble sulfur acids are for example sulphonic acids, thio-sulfonic acids, sulfamic acids, sulfinic acids and other sulfur acids, such as the acid-esters of inorganic sulfur acids, such as for example, sulfonic, thiosulfuric, sulfurous and thiosulfurous, etc. These sulfur acids can be aliphatic, cycloaliphatic, and aliphatic substituted aromatic in character, the only requirement being that the corresponding metal salts be oil soluble. From the standpoint of solubility characteristics, the aliphatic type of sulfur acid should preferably contain a total of at least about 15–18 carbon atoms; the cycloaliphatic sulfur acids should contain a total of at least about 12–15 carbon atoms; whereas the aliphtaic substituent or substituents in the aromatic sulfur acids should contain a total of at least about 15–18 carbon atoms.

The acids of phosphorus which can be employed as starting materials include for example the organic phosphorus acids such as phosphonic and phosphinic acids and the thio-analogues thereof; and the acid-esters of phosphoric acid, thiophosphoric acids, phosphorus acid, thiophosphorous acids and hypophosphorous acid. The organic portion of such acids can be aliphatic, cycloaliphatic, or aliphatic substituted aromatic in character. The aliphatic type acids should contain a total of at least about 8 carbon atoms; the cycloaliphtaic type acids should contain a total of at least about 10 carbon atoms; whereas the aliphatic substituent or substituents of the aromatic type acids should contain a total of at least about 12 carbon atoms. The metal salts of the acids of phosphorus are also used as starting materials in preparing metal complexes just so long as they are oil-soluble.

Specific examples of organic acids which can be employed either alone or in admixture with the metal salts thereof are as follows: The fatty acids e. g. palmitic, stearic, oleic, linoleic, etc.; the aliphatic substituted aromatic carboxylic acids e. g. stearyl benzoic acid, mono- and poly-wax substituted benzoic and naphthoic acids, cetyl hydroxy benzoic acid, cetyl benzene carboxylic acid, etc.; dithiophosphorous acids, e. g., dicapryl dithiophosphorous acids, di (methylcyclohexyl) dithiophosphorous acids, dilauryl dithiophosphorous acids, etc.; dithiophosphoric acids, e. g., dicapryl dithiophosphoric acids, dilauryl dithiophosphoric acids, etc.; monothiophosphoric acids, e. g., lauryl monothiophosphoric acids, etc.; mahogany sulphonic acids; aliphatic sulphonic acids, e. g., petrolatum sulphonic acid, white-oil sulphonic acid, paraffin wax sulphonic acids, hydroxy substituted paraffin wax sulphonic acids, tetraisobutylene sulphonic acids, tetra-amylene sulphonic acids, chloro substituted paraffin wax sulphonic acids, etc.; the substituted aromatic sulphonic acids, e. g., mono- or poly-wax substituted naphthalene sulphonic acids, -phenol sulphonic acids, -diphenyl ether sulphonic acids, -naphthalene sulfide sulphonic acids, -diphenyl amine sulphonic acids and cetyl substituted-chlorobenzene sulphonic acids, -phenol sulphonic acids, -phenol disulfide sulphonic acids, etc.; cycloaliphatic sulphonic acids, e. g., petroleum naphthene sulphonic acids, cetyl-cyclopentyl sulphonic acids, lauryl-cyclohexyl sulphonic acids, bis (diisobutyl) cyclohexyl sulphonic acids, etc.

Additional examples are the thio-analogues of the sulfonic acids listed above, for example, mahogany thio-sulfonic acids, white-oil thiosulphonic acids, etc.

Where reference is made to the wax radicle, this is intended to include radicles comprising or derived from hydrocarbon waxes such as petroleum waxes containing at least about eighteen carbon atoms.

The metals forming the salts of the organic acids enumerated above can be either of the mono- or polyvalent type such as the light or heavy metals, including for example the alkali and alkaline earth metals. Specific examples of metals are sodium, potassium, lithium, barium, magnesium, strontium, lead, calcium, manganese, cobalt, tin, iron, cadmium, zinc, copper, etc. Among the salts employed as starting materials in the preparation of the metal complexes it is preferred to employ the alkaline earth metal salts.

Employed with the oil-soluble-salt forming organic acid and/or salt thereof, which were described hereinabove as one component of the process mass, is the promoter material. The promotor can be represented by the formula RXM, where R is an organic radicle or residue, X is an element selected from the class consisting of oxygen and sulphur, and M is either a metal or hydrogen. This promoter should have an ionization constant measured in water at about 25° C. greater than about $1\times10^{-10}$, a water solubility of at least about 0.0005% measured at 50° C. and a pH value of not greater than 7 when in saturated aqueous solutions at about 25° C.

The promoters found useful for the purposes of this invention include phenol; alkylated phenols, e. g., cresol, xylenol, n-propyl phenols, di-isopropyl phenols, tertiary butyl phenols, sec-hexyl phenols, n-heptyl phenols, iso-octyl phenols, cetyl phenols, etc.; aryl substituted phenols, e. g. phenyl phenol, diphenyl phenols, phenoxy phenols, etc.; polyhydroxy aromatic compounds such as alizarin, quinizarin or polyhydroxy benzenes e. g., hydroquinone, catechol, pyrogallol, etc.; monohydroxy naphthalenes e. g. -naphthol, β-naphthol, etc.; polyhydroxy naphthalenes, e. g., naphthohydroquinone, naphthoresorcinol, etc.; the alkylated polyhydroxy aromatic compounds, e. g. octyl catechols, mono-(triisobutyl) pyrogallols, etc.; substituted phenols such as p-nitro-o-chlorophenol, p-amino-phenol, etc.; lower molecular weight hydroxy aromatic carboxylic acids such as salicyclic acid, gallic acid, 4-hydroxyl-1-naphthoic acid, etc.; lower molecular weight aromatic sulphonic acids such as p-cresol sulphonic acids, p-t-butyl-phenol sulphonic acids, beta-naphthol alpha-sulphonic acid, etc.; lower molecular weight aromatic acids, such as benzoic acid, p-nitro-benzoic acid o-chloro-benzoic acid, p-toluic acid, p-t-butyl-benzoic acid, alpha-naphthoic acid, etc.; lower molecular weight aromatic sulphonic acids such as benzene sulphonic acid, p-chlorobenzene sulphonic acid, trichlor-diphenyl ether sulphonic acid, p-nitrobenzene sulphonic acid, p-tolyl sulphonic acid, p-t-butyl-benzene sulphonic acid, t-amyl-naphthalene sulphonic acids, etc.; lower molecular weight aliphatic sulphonic acids such as ethyl sulphonic acid, beta-chloro-ethyl sulphonic acid, gamma-nitro-propyl sulphonic acid, octyl and octenyl sulphonic acid, chloro-diisobutyl sulphonic acids, etc.; nitroparaffins e. g. 1-nitro-propane, 2-nitro-propane; 2,6-di-nitro-n-octane, and mono- and poly-nitro substituted paraffin wax; thio acids of phosphorus including aliphatic dithiophosphoric acids, e. g., di-isopropyl dithiophosphoric acids, di-n-butyl dithiophosphoric acids, etc., aromatic dithiophosphoric acids, e. g., phenyl dithiophosphoric acids, etc., the aliphatic mono thiophosphoric acids, e. g., di-ethyl mono-thiophosphoric acids, etc., the aromatic mono-thiophosphoric acids, isopropyl-phenyl monothiophosphoric acids, etc.

With respect to the sulphonic acids, it is intended herein to employ the term "petroleum sulphonic acids" to cover all sulphonic acids which are derived from petroleum products.

The promoters enumerated above can be used as such and/or in the form of the corresponding metal salts. These salts include those formed with mono- or polyvalent metals such as the light or heavy metals. Specific examples of such metals are the alkali and alkaline earth metals such as sodium, potassium, calcium, barium, strontium, magnesium, as well as other examples of metals, such as aluminum, zinc, lead, cadmium, iron, cobalt, manganese, copper, etc.

However, it is to be understood that the above enumerated promoters are not equivalent, but that under certain conditions some are more effective or desirable than others.

In preparing the metal complexes, the overbasing agent or the inorganic metal compound used contains the following structural formula: MX, wherein X is an anionic inorganic radicle such as for example, hydroxyl, oxide, carbonate, bicarbonate, sulfide, hydro-sulfide, halide, hydride, amide, basic carbonate, etc., and M is one equivalent of either a mono- or polyvalent metal. These inorganic metal compounds should have a water solubility of at least about 0.0003% at 50° C., preferably at least about 0.006%. Also preferred are those inorganic metal compounds which have a pH value greater than 7 in saturated aqueous solutions, and are referred to hereinafter for convenience as the "basic" types.

Specific examples of inorganic compounds found useful for this invention are barium oxide, calcium oxide, strontium oxide, copper oxide, manganese oxide, iron oxide, sodium hydroxide, potassium hydroxide, barium hydroxide, strontium hydroxide, calcium hydroxide, copper hydroxide, iron hydroxides, stannous or stannic hydroxide, sodium carbonate, barium carbonate, potassium carbonate, calcium carbonate, magnesium carbonate, iron carbonates, copper carbonates, lead carbonates, barium hydride, barium amide, barium chloride, copper chlorides, sodium chloride, potassium chloride, calcium chlorides, magnesium chloride, iron chlorides, tin chlorides, cobalt chlorides, sodium nitrate, barium nitrate, potassium nitrate, calcium nitrate, strontium nitrate, magnesium nitrate, iron nitrates, copper nitrates, cobalt nitrates, manganese nitrates, lead nitrates, zinc nitrate, sodium sulphate, potassium sulphate, calcium sulphate, strontium sulphate, magnesium sulphate, iron sulphates, tin sulphates, lead sulphates, manganese sulphates, etc. The corresponding basic salts of the above enumerated compounds are also included. However, it should be understood that all the inorganic metal compounds are not equivalent for the purposes of this invention because under certain conditions and for particular uses some inorganic compounds are more effective or desirable than others.

Water, with or without one or more water-soluble alcohols, is also present in the process mass in preparing the metal complexes. The water can be present as a result of an addition or as that which is present in the form of combined water, or water of hydration in one or more of the components. It is preferred, however, to add water to the mass to effect metal complex formation.

There are 5 methods by which the metal complexes can be prepared and these are as follows:

(a) The promoter added to the oil-soluble normal salt of the organic acid, followed by addition of an aqueous solution or suspension of the inorganic metal compound thereto; the mixture is held at a superatmospheric temperature for a reasonable length of time while insuring thorough mixing, and then the total admixture is further heated to remove substantially all of the water;

(b) The inorganic metal compound in a dry state is added to a mixture of oil soluble organic acid and/or a normal salt of such organic acid, promoter and water, heating while insuring thorough mixing, and then further heated to remove substantially all of the water;

(c) The acid of the desired salt of organic acid is mixed with the promoter, then an aqueous solution or suspension of the inorganic metal compound is added thereto, the mixture is heated and agitated at a superatmospheric temperature for a time sufficient to insure thorough mixing, and followed by subjecting the total mixture to dehydration conditions in order to remove substantially all of the water;

(d) In any of the methods discussed herein for preparing the salt complex, a substantial increase in metal content is usually effected by treating the mass containing the metal complex with an acidic material just after substantially all of the water is removed and just before the mass is filtered;

(e) The sediment formed from any of the aforementioned methods can be employed either alone or with additional promoter in any of the four methods given above.

Since the metal complexes are to be used in the superbasing process hereinafter more specifically defined and which process requires the presence of at least a minor amount of water, the dehydration step (referred to above as the removal of substantially all of the water) need not be complete.

Generally, the relative amounts of oil-soluble-salt-forming acidic organic compound and/or the metal salt thereof and the promoter employed in preparing the metal complexes are expressed as the ratio of equivalents of the former to the latter. In accordance therewith, the ratio of equivalents is from about 0.1 to 1, to about 10 to 1; preferably from about 1.5 to 1 to about 3.5 to 1. The amount of inorganic metal compound employed is such that there are present in the process mass more than about 1 equivalent of metal including the equivalents of metal which are present in the promoter and the oil-soluble salt of the organic acid. The quantity of inorganic compound may be as high as 600% in excess of that required to form the normal salt with the oil-soluble-salt-forming organic acid, or it can be as low as a slight excess over that required to form the normal salt of the oil-soluble-salt-forming organic acid. Water is used in combination with the three aforementioned components. It has been found that the metal complex can be prepared when using quantities as low as about 1 mole of water per mole of inorganic metal compound. However, more usually, about 5 to 50 moles of water per mole of inorganic metal compound are used, preferably about 15 to 30 moles per mole.

The essential components described above are processed at a temperature not substantially in excess of about 350° C., preferably about 110° to 200° C.; and for a period of at least about 15 minutes or less or as high as 10 to 15 hours, more usually about 1 to 5 hours. At these elevated temperatures substantial amounts of water are driven off and the formation of the metal complexes is thereby effected.

In order to facilitate an understanding of the amount of metal which is present in the superbased salts or the organic salt complexes of this invention, for the purposes of this specification and the appended claims the amount of metal or "metal ratio" is the ratio of the total metal in the complex to the amount of metal required to form the normal salt of the oil-soluble-salt-forming organic acid.

The basic salt

In preparing the basic salts, the organic acid compounds described above under the discussion of the "metal complex" can be also employed as starting materials. It is to be noted, however, that of the organic acid compounds listed thereunder, the sulphonic acids and/or metal sulphonates are preferred.

Likewise the overbasing agent or the inorganic metal compound which is combined with the oil soluble organic acid and/or the salt thereof, can be any of those described under the discussion of the preparation of the "metal complex." In this respect, however, the oxides and hydroxides are preferred as the inorganic metal compounds.

The other component which is present along with those mentioned above is water. Water is present in the mixture or mass as a result of addition or in the form of combined water, or water of hydration in one or more of the components. In any event it is preferred to employ free water in this process, in accordance with the amounts specified above in connection with the metal complex.

Methods by which these basic salts may be prepared are given in the Mertes, Griesinger and the Campbell et al. patents mentioned hereinabove. Generally the amount of inorganic metal compound used in the process can be as high as a four to five hundred per cent excess above that required to form the normal salt of the oil-soluble-salt-forming organic acid. More usually, however, the quantity of inorganic metal compound used represents an excess of about 100% or 200%, based on the salt of the oil-soluble organic acid.

After the components are mixed thoroughly, the temperature is maintained at a level of about 150° F. to 500° F., preferably about 350° F. to 450° F. At this elevated temperature the mass becomes substantially dehydrated and the basic salt is thus formed.

Although the basic salts and metal complexes can be employed as starting materials for the preparation of the superbased salts, it should be understood that they are not equivalent for this invention, because generally, the metal complexes result in superbased salts which are superior to those prepared from the basic salts.

The superbased salt

The metal complex or basic salt or any other organic salt complex is treated with a material possessing acid characteristics under process conditions. As noted above this material is termed the "acidic material." The acidic material can be either a liquid, gas or solid. Those acidic materials found useful for this invention include the strong or weak acids, such as for example, hydrochloric acid, sulfuric acid, nitric acid, acetic acid, carbonic acid, etc. In the form of a gas, the acidic material is an anhydride of an acid or an "acid anhydride gas." Specific examples of acidic materials include, HCl, $SO_2$, $SO_3$, $CO_2$, air (considered acidic because of $CO_2$ content), $NO_2$, $H_2S$, $H_2Se$, $N_2O_3$, $PCl_3$, $SOCl_2$, $ClO_2$, $H_2F_2$, $BF_3$, $CS_2$, COS, etc.

The acidic material selected for use should be such that it is capable of reaction, under process conditions, with a substantial portion of the components of the organic salt complex which contains that portion of the metal which is in excess of the normal salt. Stated in another way, the acidic material to be used should be such that its acidity, under process conditions, is greater than the acid which would be derived from at least a substantial portion of the anionic radicles present in the organic salt complex.

It is understood, however, that all the acidic materials are not equivalent because under certain conditions or for particular uses some are more effective or desirable than others.

The treatment of the organic salt complex, e. g., the metal complex or basic salt or the like, with an acidic material is effected at a temperature of about 25° to 250° C., preferably about 120 to 170° C., and usually employing about 0.5 to 20% of acidic material, based on the weight of the organic salt complex. The time of treatment with the acidic material can vary considerably depending on the desired result and, as would be expected, short periods of treatment will cause less metal to enter into combination with the organic salt complex, whereas long periods of treatment make possible the combining of large mounts of inorganic metal compound with the treated organic salt complex. However, in general, periods of treatment will range from about 0.25 to 30 hours. The duration of the treatment period will be dependent upon the concentration of acidic material, the rate of addition thereof and the rate of reaction.

It should be understood that treatment of the organic salt complex with an acidic material can be accomplished either prior to filtering such starting materials from the masses resulting from their methods of preparation, or after they are separated from such masses by filtration or any other means. If the metal complex, basic salt or the like is treated by the former method, then it is not necessary to further treat the organic salt complex with an acidic material prior to combining same with additional inorganic metal compound. By either method, however, the conditions of treatment with the acidic material are the same as given hereinabove.

After the organic salt complex has been treated with an acidic material, the treated material is combined in one instance with an inorganic metal compound with or without water. The technique to effect the further complexing of metal or the formation of superbased salts is essentially the same as that described above in connection with basic salt or metal complex.

It is not always necessary to employ water in that step of forming superbased salts wherein the additional metal compound is incorporated in the acid-treated organic salt complex, however, the presence of water in this step is not harmful to the formation of the superbased salt and in some instances it is beneficial. In those instances where the presence of water is beneficial, the amount of water present in the mass is about 3 to 50%, preferably about 5 to 30%, based on the weight of treated organic salt complex. The inorganic metal compounds found useful for this purpose can be any of those described above under the discussion of the preparation of the metal complex. Generally, however, about 3 to 60%, preferably about 5 to 40% of inorganic metal compound, based on the weight of treated organic salt complex is employed in forming the superbased salt.

The treated complex, the inorganic metal compound, with or without water are mixed thoroughly and then heated to a temperature not substantially in excess of 350° C. preferably about 110° to 200° C. At such temperatures any water, if present, is removed from the process mass and the superbased salt is thereby formed. The time of processing can take as little as about 15 minutes or less or can be as high as 10 to 15 hours, however, usually it will take about 1 to 5 hours when employing atmospheric pressure.

The necessary process time will be dependent largely upon the factors which influence the liberation of water from the reaction mass.

In the preparation of the superbased salt there is available an alternative method by which substantial increases in metal content are effected. The organic salt complex as noted herein is first treated with an acidic material and then the treated material is combined with an inorganic metal compound, with or without water, and then substantially all of the water is removed at preferably elevated temperatures. The significant feature of the alternative method is to combine with the essential components of the process mass in the superbasing step a promoter material which is described hereinabove under the metal complex preparation. The remaining steps of the method are conducted in a similar way as hereindescribed, in that the mixture is heated at elevated temperatures to remove substantially all of the water which may be present.

With reference to the promoter, in the case of the use of a metal complex as the starting material, in general the promoter used in the preparation of such complex will still be present and will then be capable of functioning as part or all of the promoter utilized in this alternative method.

Generally, for the alternative method of preparing the superbased salt, about 2 to 50% of the promoter, preferably about 5 to 25%, based on the weight of the acidic material treated organic salt complex; about 3 to 60%, preferably about 5 to 40% of inorganic metal compound; and about 0 to 50%, and more usually about 5 to 30% of water are combined; and the mixture is then heated at preferably elevated temperatures to remove substantially all of the water which may be present. The temperature at which all of the water is substantially removed is not substantially in excess of 350° C., preferably about 110° to 200° C.

It is still further contemplated that the unfiltered mass containing the superbased salt may be treated with an acidic material, and then filtered to purify the desired superbased salt. This additional treatment may effect a substantial increase in metal ratio over the superbased salt which has not been treated with an acidic material prior to filtering. The improved results are achieved regardless of what method or starting material is used in preparing the superbased salt. This applies to all organic salt complexes, e. g., metal complexes, basic salts, or the like. The important feature of this alternative treatment is that the mass containing the superbased salt be treated with the acidic material prior to filtering.

To effect these improved results, the process mass containing the superbased salt is treated with about 0.5 to 30% of acidic material, based on the weight of the process mass, prior to filtering same. The temperature of treatment can vary from about 25° to 250° C., preferably about 50° to 170° C.; whereas the period of treatment will vary from about 0.25 to 30 hours. The acidic material is the same as described hereinabove.

It is also intended within the present invention that a series of superbasing steps may be employed to obtain high metal content materials. In other words, after obtaining a superbased salt, either before or after filtration it can be treated with an acidic material and then the acidic material-treated-superbased salt can be combined with additional inorganic metal compound, with or without water, and with or without a promoter, and heated at elevated temperatures to remove substantially all of the water which may be present. This procedure can be repeated as many times as is practicable or desirable.

The following specific examples serve to show the significant increases in metal concentrations which can be effected with respect to basic salts and metal complexes, by virtue of the present invention.

We have found that sulphate ash and/or metal content values, and the metal ratio values calculated therefrom, are one means for characterizing certain of the superbased salts. As the description of the invention proceeds, it will become apparent that the neutralization number of a superbased salt is in certain instances an unreliable index of the amount of excess metal in such complex, since it is greatly affected by the type of inorganic metal compound employed and can be varied within wide limits without significantly changing the metal content of the product by treatment of the mass with air, $CO_2$, and the like.

The above is not to be construed as a statement that the neutralization number is not an important property of a superbased salt. For some uses, for example in lubricants, it is advantageous in certain instances to employ a superbased salt of a substantially neutral character, whereas in other instances a superbased salt of high alkalinity has been found to produce desirable results.

EXAMPLE 1

6000 grams of a 30% solution of barium petroleum sulphonate (sulfate ash 7.6%), 348 grams of para-tertiary butyl phenol, (ratio of equivalents is 1.53), and 2911 grams of water were mixed and heated to a temperature of 60° C. 1100 grams of barium oxide were added slowly and the temperature of the total mixture was raised to 94–98° C. and held there for one hour. The temperature of the mixture was then slowly raised over a period of 7½ hours to about 150° C. and held at that level for an additional hour, until substantially all the water was removed. The metal complex obtained is a liquid, brown in color, and did not contain any odor. The following properties were determined.

Basic No. _____ 82.5
Percent sulfate ash _____ 26.0
Metal ratio _____ 4.35

EXAMPLE 2

6623 grams of the metal complex produced in accordance with Example 1 were treated with $SO_2$ until 327 grams of the gas were combined with the metal complex. The product thus obtained had a neutralization number of 0. The $SO_2$-metal complex product was liquid, brown in color, and did not contain any odor.

EXAMPLE 3

1000 grams of the $SO_2$-treated metal complex produced in accordance with Example 2 were mixed with 286 grams of water and heated to a temperature of 60° C. Thereafter 107.5 grams of barium oxide were added slowly and the temperature was then maintained at 94–98° C. for one hour. Following this step, the total mixture was raised in temperature to 150° C. over a period of 1⅙ hours and held there for a period of one hour. The superbased salt was purified by filtration, and was found to be a liquid, brown in color, and did not contain any odor. The following properties of the superbased salt were determined.

Basic No_____ 38.6
Percent sulfate ash_____ 33.7
Metal ratio_____ 6.30

It can be seen from Example 1 that the sulphate ash of the product increased from 26.0 to 33.7. Furthermore, the product produced in Example 2 involved the treatment of complex with $SO_2$ to obtain a zero basic number; whereas in Example 3, the basic number was increased to 38.6. It is clearly shown, therefore, that by additionally treating the $SO_2$-metal complex product with an inorganic metal compound, the resultant product contains additional metal over and above that which is found in the complex prior to treatment with the organic metal compound.

In the next three samples, it will be shown that water is not required in the superbasing step, in order to obtain superbased salts which contain substantially more metal than the organic salt complex starting material.

EXAMPLE 4

6000 grams of 30% oil solution of barium petroleum sulphonate, (sulfate ash 7.6%) 348 grams of para-tertiary-butyl phenol, (ratio of equivalents is 1.53) and 2911 grams of water were mixed and heated to a temperature of 60° C. To this mixture were slowly added 100 grams of barium oxide and the temperature was then raised to 94–98° C. and held there for a period of one hour. The total mixture is raised in temperature to 150° C. over a period of 7½ hours and held there for a period of one hour. The metal complex is separated by filtering the product. The complex was found to be a liquid, brown in color, and did not contain any odor. The following properties were determined for the product.

Basic No_____ 72.8
Percent sulfate ash_____ 22.3
Metal ratio_____ 3.69

EXAMPLE 5

6190 grams of the metal complex obtained in accordance with the method given in Example 4 above were treated with $CO_2$ for a period of 1½ hours, at a temperature of 26°–55° C. The total gain in weight of the complex by virtue of the $CO_2$ treatment was 179 grams. The final product had a basic number of 1.5.

EXAMPLE 6

1029 grams of the $CO_2$-metal complex of Example 5 were heated to 50° C. and then 109.8 grams of anhydrous barium hydroxide were added. The total mixture was held at a temperature of 100° C. for one hour and the temperature was raised to 150° C. and held at that level for a period of one hour. The desired superbased salt was separated by filtering and was found to be fluid in consistency, and reddish brown in color. The following properties were determined.

Basic No_____ 31.5
Percent sulphate ash_____ 28.6
Metal ratio_____ 5.10

By comparing the product formed in Example 6 with the product of Example 4, it can be seen from the sulphate ash analyses that an appreciable amount of metal has been incorporated in the ultimate product.

The above examples illustrated the use of metal complexes as starting materials in preparing superbased salts. The following examples demonstrate the use of basic salts as starting materials for preparing superbased salts.

EXAMPLE 7

2500 grams of a 30% oil solution of barium petroleum sulphonate having a 7.6% sulfate ash were heated to 95° C., and a slurry of 386 grams of BaO and 1215 grams of water was added thereto. After holding the total mixture at 100° C. for 1 hour, the temperature was raised to 150° C. over a three hour period and held there for 1 hour. The mixture was filtered, and the filtrate was diluted with 13% by weight of a solvent refined Mid-Continent oil having a viscosity of 120 SUS @ 100° F. to yield a product having the following analysis:

Basic No_____ 30.0
Percent sulfate ash_____ 14.2
Metal ratio_____ 2.25

EXAMPLE 8

8500 grams of the basic salt prepared as in Example 7, were blown with $CO_2$ at 29–42° C. for a period of 1 hour. An 85 gram increase in product occurred due to the $CO_2$ treatment. Then 858 grams of $H_2O$ and 365 grams of $Ba(OH)_2$ were added, the latter being added slowly. The mixture was finally heated to 150° C. over 5¼ hours and held at that level for 1 hour. The desired superbased salt was obtained by filtering the process mass. The product possessed the following properties:

Basic No_____ 17.5
Percent sulfate ash_____ 18.6
Metal ratio_____ 2.95

It can be seen that the basic salt had a sulfate ash of 14.2%, whereas the product obtained in accordance with the present invention showed an increase to 18.6% sulfate ash.

EXAMPLE 9

(a) 2500 grams of a 30% oil solution of barium petroleum sulphonate having a 7.6% sulfate ash were heated to 95° C., followed by the addition of a slurry of 386 grams of BaO and 1215 grams of water. The mixture was stirred for 1 hour at 100° C., then the temperature thereof was raised to 150° C. over a three hour period, and held there for 1 hour. The mixture was filtered and the product analyzed as follows:

Basic No_____ 38.0
Percent sulfate ash_____ 16.0
Metal ratio_____ 2.25

(b) The basic salt obtained above was heated to 150° C. and blown with air over a 28 hour period, while maintaining the temperature in the range of 145–150° C. After the air blowing step, the process mixture had a basic number of 2.

(c) 1500 grams of the air-blown basic salt prepared under (b) were stirred with 128 grams of $Ba(OH)_2$ and 150 grams of water. The mixture was heated to 170° C., and held for 1 hour in the range of 150–170° C. The process mixture was filtered, and the resultant superbased salt analyzed as follows:

Basic No_____ 39.0
Percent sulfate ash_____ 25.1
Metal ratio_____ 3.87

EXAMPLE 10

(a) The basic salt was prepared according to the method described in Example 7.

(b) 8000 grams of the product (a) above were blown with $SO_2$ for 15 minutes. An exothermic effect took place, causing the temperature to rise to a maximum of about 50° C. The product after $SO_2$ blowing weighed 8099 grams (indicating that 99 grams of $SO_2$ were combined) and had a basic number of 1.9.

(c) 5500 grams of the $SO_2$ treated basic salt of step (b) above were stirred with 467 grams of $Ba(OH)_2$ and 550 grams of water. The entire mixture was heated to 150° C. over 3.75 hours and held at that level for 1 hour.

The desired superbased salt was obtained by filtration, and analyzed as follows:

Basic No. .................................. 25.6
Percent sulfate ash ......................... 18.3
Metal ratio ................................. 3.04

The following examples illustrate the use of a promoter in the superbasing step, as well as the beneficial effects derived in treating the superbased salt with an acidic material prior to filtering same from the process mass.

EXAMPLE 11

400 lbs. of a 30% oil solution of barium petroleum sulphonate (sulfate ash 7.6%) were placed in a suitable vessel and heated to 26° C. At this temperature 32.5 lbs. of diisobutylphenol were added, and the mixture was mixed thoroughly. Then 197 lbs. of water were added, followed by an addition of 73 lbs. of BaO over a 30 minute period, while keeping the temperature at 57–84° C. Thereafter the temperature was raised to 100° C. and kept there for 1 hour, followed by another temperature increase to 152° C. and maintained at the latter level also for 1 hour. The process mixture was then blown with 75 lbs. of $CO_2$ over a three hour period and at a temperature of 135–170° C. The separated product had the following properties:

Basic No. .................................. 5.0
Percent sulfate ash ......................... 25.7
Metal ratio ................................. 4.35

EXAMPLE 12

1000 grams of the product produced above in Example 11 and 121.8 grams of diisobutyl-phenol were placed in a suitable container and mixed thoroughly at 50° C. Then 234 grams of $Ba(OH)_2$ were added, followed by raising the temperature of the mass to 100° C. and holding for 1 hour. The temperature of the mixture was again raised to 150° C. and maintained at that level for 1 hour. A portion of the process mass was filtered and the separated product analyzed as follows:

Basic No. .................................. 42.8
Percent sulfate ash ......................... 33.7
Metal ratio ................................. 6.3

The remainder of the unfiltered process mass was blown with $CO_2$ at a rate of 3 cubic feet per hour for 1 hour at 150° C. The process mass was then filtered and the desired superbased salt had the following properties.

Basic No. .................................. 7.6
Percent sulfate ash ......................... 39.8
Metal ratio ................................. 9.3

The above data clearly demonstrates the beneficial use of a promoter in preparing a superbased salt. Furthermore, it should be noted that upon treating the process mass, prior to filtering, with an acidic material, the metal content is substantially increased as is evident from the sulfate ash analyses in the above example.

Another experiment was conducted in which a different promoter was utilized in the superbasing step.

EXAMPLE 13

380 pounds of a 30% oil solution barium petroleum sulphonate having a 7.6% sulfate ash, 21.9 pounds of para-tertiary butyl phenol and 184 pounds of water were admixed in a suitable vessel, and then heated to 124° F. 68 pounds of BaO were added to the mixture over a 1½ hour period while the temperature was maintained at 124°–184° F. The temperature of the total mixture was raised to 211° F. in one hour and maintained at that level for an additional hour. Thereafter, the temperature was again raised to 308° F. over a 4.8 hour period and held at that level for 1 hour. Hyflo, a filter aid, was added and the material was filtered while still hot. The separated product had the following properties.

Basic No. .................................. 80.5
Percent sulfate ash ......................... 26.0
Metal ratio ................................. 4.2

EXAMPLE 14

355 pounds of the metal complex of Example 13 were heated to about 110° F. Then 14.5 pounds of gaseous $CO_2$ were passed through the metal complex over a 5½ hour period, while maintaining the temperature at about 110°–165° F. The treated metal complex was cooled and the following analyses were determined.

Acid No. ................................... 2.4
Percent sulphate ash ........................ 25.1
Metal ratio ................................. 4.2

3000 grams of the above $CO_2$ treated metal complex and 210 grams of para-tertiary butyl phenol were mixed together and heated to 100° C. 618 grams of BaO were added to the mixture, and then the temperature was held at 100° C. for 1 hour. Thereafter the temperature of the total mixture was raised to 150° C. in 70 minutes and held at that level for 3 hours. 666 grams of the process mass were filtered, and the separated product analyzed as follows:

Basic No. .................................. 86.0
Percent sulphate ash ........................ 39.1
Metal ratio ................................. 8.0

The remainder of the process mass, 3016 grams, was blown with $CO_2$ for 25 minutes at 150° C. A 52 gram increase in weight of process mass was noted as a result of $CO_2$ treatment. The mass was filtered and the separated product analyzed as follows:

Basic No. .................................. 10.25
Percent sulphate ash ........................ 40.9
Metal ratio ................................. 8.35

The superbased salts, produced in accordance with the present invention can be employed in lubricants including oils and greases, and for such purposes as in crankcases, transmissions, gears, etc., as well as in torque converter oils. Other suitable uses for such superbased salts are in asphalt emulsions, insecticidal compositions, fireproofing and stabilizing agents in plasticizers and plastics, paint driers, rust inhibiting compositions, pesticides, foaming compositions, cutting oils, metal-drawing compositions, flushing oils, textile treatment compositions, tanning assistants, metal cleaning compositions, emulsifying agents, antiseptic cleansing compositions, penetrating agents, gum solvent compositions, fat splitting agents, bonding agent for ceramics and asbestos, asphalt improving agents, flotation agents, improving agents for hydrocarbon fuels such as e. g. gasolene and fuel oil, etc.

More particularly, the complexes of this invention are especially adapted for the preparation of lubricants, paint driers and plastics, particularly the halogen bearing plastics. In these respects, the superbased salt can be employed in the following concentrations based on the weight of the total composition.

| | Broad range | Usual range | Preferred range |
|---|---|---|---|
| | *Percent* | *Percent* | *Percent* |
| Lubricant | 0.01–20 | 0.2–15 | 0.5–10 |
| Stabilizing Agent for Plastics | 0.05–5 | 0.1–3 | 0.2–2 |
| Paint Drier | 0.2–25 | 0.5–20 | 1.0–15 |

To better appreciate the wide variety of uses to which the superbased salts of this invention are adapted, the following specific examples are given:

Percent by weight

Use in a lubricant:
  (1) SAE 20 motor oil .................... 97.0
      Product of Example 12 ............... 3.0

(2) SAE 20 motor oil .................... 95.0
      Product of Example 6 ................ 4.0
      Zinc di-n-hexyl dithiophosphate ..... 1.0

Use as a stabilizing agent for halogen bearing plastics:
  Poly-chloroprene ........................ 40.0
  Di-lauryl sebacate ...................... 59.25
  Product of Example 3 .................... 0.75

Use as a paint drier:
  Enamel (alkyd resin) .................... 99.0
  Product of Example 10 ................... 1.0

Other modes of applying the principle of the invention may be employed, change being made as regards the details described, provided the features stated in any of the following claims or the equivalent of such be employed.

We therefore particularly point out and distinctly claim as our invention:

1. A process for preparing superbased salts which comprises:

I. First preparing at least one alkaline earth metal complex by the process which comprises preparing and mixing a mass in which, at 50° C., at least 50% of the components are in the liquid state, and in which mass the active components consist of:
A. At least one oil-soluble organic acid compound containing at least 12 carbon atoms in the molecule selected from the class consisting of the aliphatic and cyclic; sulphur acids, carboxylic acids, phosphorus acids, the thio acids corresponding to any of the foregoing acids, and the alkaline earth metal salts of any of said acids;
B. At least one organic compound selected from the class consisting of phenolic organic compounds and the alkaline earth metal salts thereof, said phenolic organic compounds having (1) an ionization constant in water of at least about $1 \times 10^{-10}$ at about 25° C.; (2) a water solubility at 50° C. of at least about 0.0005%; and (3) in saturated aqueous solutions at about 25° C. a pH of less than 7;

the relative amounts of A and B used being in the range of from about one equivalent of A to about 10 equivalents of B to about 10 equivalents of A to about one equivalent of B;

C. At least one inorganic alkaline earth metal compound; (1) which is water-soluble at a temperature of 50° C. to the extent of at least about 0.0003%; (2) in an amount such that there are present in the mass substantially more than 1 equivalent of alkaline earth metal, including the alkaline earth metal present in the remaining components, per equivalent of A plus B; and
D. Water including water of hydration, in an amount equal to at least about one mole per mole of C;

maintaining the mass at a temperature and for a period of time sufficient to drive off substantially all water and water of hydration which may be present, and form the organic alkaline earth metal complex;
II. Treating the organic alkaline earth metal complex with an inorganic acidic material of which the ionization constant is higher than the ionization constant of the organic salt-forming compound of Component B;
III. Admixing said acid treated alkaline earth metal complex material with at least one inorganic alkaline earth metal compound having a pH value greater than 7 in saturated aqueous solutions and heating to a temperature not substantially in excess of 350° C. to form the superbased salt.

2. The process defined in claim 1 further characterized in that said acid treated alkaline earth metal complex material is admixed with at least one inorganic metal compound and at least one phenolic organic compound.

3. The process defined in claim 1 further characterized in that said acid treated alkaline earth metal complex material is admixed with at least one inorganic metal compound, at least one phenolic organic compound, and water.

4. The process defined in claim 1 further characterized in that said acid treated alkaline earth metal complex material is admixed with at least one inorganic metal compound and water.

5. A process for preparing superbased salts which comprises:

I. First preparing at least one alkaline earth metal complex by the process which comprises preparing and mixing a mass in which, at 50° C., at least 50% of the components are in the liquid state, and in which mass the active components consist of:
A. At least one oil-soluble organic acid compound containing at least 12 carbon atoms in the molecule selected from the class consisting of the aliphatic and cyclic; sulphur acids, carboxylic acids, phosphorus acids, the thio acids corresponding to any of the foregoing acids, and the alkaline earth metal salts of any of said acids;
B. At least one organic compound selected from the class consisting of phenolic organic compounds and the alkaline earth metal salts thereof, said phenolic organic compounds having (1) an ionization constant in water of at least about $1 \times 10^{-10}$ at about 25° C.; (2) a water solubility at 50° C. of at least about 0.0005%; and (3) in saturated aqueous solutions at about 25° C. a pH of less than 7;

the relative amounts of A and B used being in the range of from about one equivalent of A to about 10 equivalents of B to about 10 equivalents of A to about one equivalent of B;

C. At least one inorganic alkaline earth metal compound; (1) which is water-soluble at a temperature of 50° C. to the extent of at least about 0.0003%; (2) in an amount such that there are present in the mass substantially more than 1 equivalent of alkaline earth metal, including the alkaline earth metal present in the remaining components, per equivalent of A plus B; and
D. Water including water of hydration, in an amount equal to at least about one mole per mole of C;

maintaining the mass at a temperature and for a period of time sufficient to drive off substantially all water and water of hydration which may be present, and form the organic alkaline earth metal complex;
II. Treating the organic alkaline earth metal complex with an inorganic acidic material of which the ionization constant is higher than the ionization constant of the organic salt-forming compound of Component B; and in amounts sufficient to liberate a substantial proportion of said organic compound of Component B;
III. Admixing said acid treated alkaline earth metal complex material with at least one inorganic alkaline earth metal compound having a pH value greater than 7 in saturated aqueous solutions and heating to a temperature not substantially in excess of 350° C. to form the superbased salt.

6. The process defined in claim 5 further characterized in that said acid treated alkaline earth metal complex material is admixed with at least one inorganic metal compound and water.

7. The process defined in claim 5 further characterized in that said acid treated alkaline earth metal complex material is admixed with at least one inorganic metal compound and at least one phenolic organic compound.

8. The process defined in claim 5 further characterized in that said acid treated alkaline earth metal complex material is admixed with at least one inorganic metal compound, at least one phenolic organic compound, and water.

9. A process for preparing superbased salts which comprises treatment of an organic alkaline earth metal complex, having a metal ratio of equivalents of alkaline earth metal to equivalents of oil-soluble organic acids greater than one, with an inorganic acidic compound; combining said acid treated complex material with at least one inorganic metal compound; and heating to an elevated temperature to form the superbased salt.

10. A process for preparing superbased salts which comprises treatment of an organic alkaline earth metal complex, having a metal ratio of equivalents of alkaline earth metal to equivalents of oil-soluble acids greater than one, with an inorganic acidic compound; combining said acid treated complex material with at least one inorganic alkaline earth metal compound having a pH value greater than 7 in saturated aqueous solutions, and at least one phenolic organic compound having an ionization constant greater than $1 \times 10^{-10}$ at about 25° C., a water solubility of at least 0.0005% at 50° C. and a pH not greater than seven in aqueous solutions at 25° C.; and heating to form the superbased salt.

11. A process for preparing superbased salts which comprises treatment of an organic alkaline earth metal complex, having a metal ratio of equivalents of alkaline earth metal to equivalents of oil-soluble acids greater than one with an inorganic acidic compound; combining said acid treated complex material with at least one inorganic alkaline earth metal compound having a pH value greater than 7 in saturated aqueous solutions, at least one phenolic organic compound having an ionization constant greater than $1 \times 10^{-10}$ at about 25° C., a water solubility of at least 0.0005% at 50° C. and a pH not greater than seven in aqueous solutions at 25° C., and water; and heating to form the superbased salt.

(References on following page)

References Cited in the file of this patent

UNITED STATES PATENTS

| Number | Name | Date |
|---|---|---|
| 2,417,428 | McLennan | Mar. 18, 1947 |
| 2,418,894 | McNab | Apr. 15, 1947 |
| 2,426,540 | Watkins et al. | Aug. 26, 1947 |
| 2,459,995 | Duncan | Jan. 25, 1949 |
| 2,465,221 | Gilbert | Mar. 22, 1949 |
| 2,501,732 | Mertes | Mar. 28, 1950 |
| 2,617,049 | Asseff et al. | Nov. 4, 1952 |